US012684094B1

(12) United States Patent
D E et al.

(10) Patent No.: US 12,684,094 B1
(45) Date of Patent: Jul. 14, 2026

(54) SYSTEM AND METHOD FOR MACHINE CONTROL USING REMOTE OPERATOR STATION

(71) Applicant: Caterpillar Inc., Peoria, IL (US)

(72) Inventors: Shyam Sanker D E, Chennai (IN);
Aravind Badri, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 19/082,253

(22) Filed: Mar. 18, 2025

(51) Int. Cl.
| | |
|---|---|
| *H04N 23/90* | (2023.01) |
| *G05D 1/224* | (2024.01) |
| *H04L 47/80* | (2022.01) |
| *H04N 7/18* | (2006.01) |

(52) U.S. Cl.
CPC ........... *H04N 7/181* (2013.01); *G05D 1/2247* (2024.01); *H04L 47/801* (2013.01); *H04N 23/90* (2023.01)

(58) Field of Classification Search
CPC ...... H04N 7/181; H04N 23/90; G05D 1/2247; H04L 47/801; H04L 47/821
See application file for complete search history.

(56) References Cited

U.S. PATENT DOCUMENTS

| | | | | |
|---|---|---|---|---|
| 11,112,791 | B2 * | 9/2021 | Bhanushali | .......... G05D 1/0022 |
| 11,225,193 | B2 | 1/2022 | Chen et al. | |
| 11,546,503 | B1 * | 1/2023 | Kundu | ................... H04N 7/181 |

| | | | | |
|---|---|---|---|---|
| 11,789,445 | B2 * | 10/2023 | Huang | ................. G05D 1/0044 |
| | | | | 701/2 |
| 11,898,332 | B1 * | 2/2024 | Bridenbaugh | ......... H04N 23/90 |
| 12,140,946 | B2 * | 11/2024 | Suehiro | ............... G05D 1/0016 |
| 12,254,655 | B2 * | 3/2025 | Le | ......................... H04N 19/124 |
| 12,407,793 | B2 * | 9/2025 | Tamagawa | ................ G06T 3/60 |
| 12,413,688 | B2 * | 9/2025 | Shinohara | .............. H04N 21/24 |
| 2009/0185617 | A1 * | 7/2009 | Houghton | ............ G05D 1/0038 |
| | | | | 375/240.01 |
| 2011/0241904 | A1 * | 10/2011 | Cho | .................. H04W 52/0251 |
| | | | | 340/989 |
| 2012/0218416 | A1 * | 8/2012 | Leny | ...................... H04N 7/181 |
| | | | | 348/E7.085 |
| 2013/0286210 | A1 * | 10/2013 | Wu | ........................ G06V 20/56 |
| | | | | 348/E7.085 |

(Continued)

FOREIGN PATENT DOCUMENTS

| | | |
|---|---|---|
| CN | 111510735 | 11/2022 |
| JP | 5692894 | 4/2015 |
| JP | 6382118 | 8/2018 |

*Primary Examiner* — Brian P Yenke

(57) ABSTRACT

A method for visually monitoring an environment surrounding a mobile machine for facilitating control of the machine from a remote operator station is described. The method includes capturing at least one video feed visually representative of the environment. The at least one video feed is split into multiple feed segments. The method includes determining a gear position of a transmission and a steering angle associated with a steering system of the machine. The method includes selecting one or more feed segments from an entire set of feed segments based on the gear position and the steering angle, and transmitting the one or more feed segments to the remote operator station through a network at a bitrate higher than a first bitrate and a remaining feed segments of the entire set of feed segments to the remote operator station at a bitrate lesser than a second bitrate.

20 Claims, 9 Drawing Sheets

(56)        References Cited

U.S. PATENT DOCUMENTS

| | | | | |
|---|---|---|---|---|
| 2014/0300826 | A1* | 10/2014 | Funke | H04N 21/42204 |
| | | | | 348/734 |
| 2018/0297210 | A1* | 10/2018 | Peterson | B25J 13/089 |
| 2019/0361436 | A1 | 11/2019 | Ueda et al. | |
| 2020/0348665 | A1* | 11/2020 | Bhanushali | H04N 19/167 |
| 2021/0349460 | A1* | 11/2021 | Huang | G05D 1/0044 |
| 2021/0409650 | A1* | 12/2021 | Kobayashi | G08G 1/0129 |
| 2022/0368860 | A1 | 11/2022 | Shinohara et al. | |
| 2023/0283818 | A1 | 9/2023 | Nihei et al. | |
| 2023/0288926 | A1* | 9/2023 | Suehiro | G05D 1/226 |
| 2025/0271852 | A1* | 8/2025 | Suda | G05D 1/2247 |
| 2025/0274568 | A1* | 8/2025 | Suda | G06T 3/40 |

* cited by examiner

*900*

*902*

CAPTURE AT LEAST ONE VIDEO FEED

*904*

DETERMINE GEAR POSITION OF
TRANSMISSION OF MACHINE

*906*

DETERMINE STEERING ANGLE ASSOCIATED WITH
STEERING SYSTEM OF MACHINE

*908*

SELECT FEED SEGMENTS BASED ON GEAR
POSITION AND STEERING ANGLE

*910*

TRANSMIT FEED SEGMENTS TO ROS AT BITRATE
HIGHER THAN FIRST BITRATE AND REMAINING
FEED SEGMENTS AT BITRATE LESSER THAN
SECOND BITRATE

SYSTEM AND METHOD FOR MACHINE CONTROL USING REMOTE OPERATOR STATION

TECHNICAL FIELD

The present disclosure relates to a system and a method for controlling a machine using a remote operator station. More particularly, the present disclosure relates to transmission of video feed of the machine's surroundings to the remote operator station and optimizing a bit rate of the transmission during poor network bandwidth.

BACKGROUND

Mobile machines, such as excavators, loaders, compactors, including various on-highway, off-highway trucks, and underground machines, capable of being controlled remotely, may be equipped with vision systems. Vision systems may be used for monitoring machine surroundings and assisting with moving and manipulating the machine to perform various work tasks. These vision systems typically include one or more image capturing devices, such as cameras, mounted on the machine. The cameras may capture image data or video feeds and transmit said feeds to a display, e.g., at a remote operator station, so that an operator at the remote operator station may operate the machine in accordance with such captured and monitored data.

Vision systems for visually capturing a machine's environment may be configured to provide e.g., a 180-degree, a 270 degree, or even a 360-degree view of the machine's surrounding environment, and in doing so may include at least two cameras mounted at unique positions on the machine. As an example, feeds from the at least two cameras may be transmitted to the remote operator station. Factors hindering a steady transmission of such feeds from the machine mounted cameras to the remote operator station often include network instability and/or relatively low bandwidth conditions e.g., less than 95% of a maximum possible bandwidth, resulting in unclear and low-resolution production of the feeds at the remote operator station.

JP 6382118 B2 relates to a vehicle control apparatus that executes processes of: receiving information indicating an upper limit value of a photographic image data amount and an imaging position in vehicle cameras from a server; storing the received information indicating the upper limit value and the imaging position in a storage unit; and adjusting the image quality of the photographic image in each of the on-vehicle cameras on the basis of a positional relation with the vehicle, the imaging position, and the upper limit value. However, JP 6382118 does not disclose any specifics on whether the adjustment to the image quality of the photographic image is carried out to compensate for low network bandwidth.

SUMMARY

In one aspect, the present disclosure is directed to a method for visually monitoring an environment surrounding a mobile machine for facilitating control of the mobile machine from a remote operator station by an operator. The method includes capturing, by at least one image capturing device, at least one video feed visually representative of the environment surrounding the mobile machine at the remote operator station. The at least one video feed is split into multiple feed segments. The method further includes determining, by a control system coupled to the at least one image capturing device, a gear position of a transmission of the mobile machine during machine movement and determining, by the control system, a steering angle associated with a steering system of the mobile machine during the machine movement. Further, the method includes selecting, by the control system, one or more feed segments from an entire set of feed segments based on the gear position and the steering angle and transmitting, by the control system, the selected one or more feed segments to the remote operator station through a network at a bitrate higher than a first bitrate and a remaining feed segments of the entire set of feed segments to the remote operator station at a bitrate lesser than a second bitrate. The second bitrate is less than or equal to the first bitrate facilitated by a current network bandwidth associated with transmitting the entire set of feed segments through the network.

In another aspect, the present disclosure relates to a system for visually monitoring an environment surrounding a mobile machine for facilitating control of the mobile machine from a remote operator station by an operator. The system includes at least one image capturing device and a control system coupled to the at least one image capturing device. The at least one image capturing device captures at least one video feed visually representative of the environment surrounding the mobile machine at the remote operator station. The at least one video feed is split into multiple feed segments. The control system is configured to determine a gear position of a transmission of the mobile machine during machine movement and determine a steering angle associated with a steering system of the mobile machine during the machine movement. The control system is further configured to select one or more feed segments from an entire set of feed segments based on the gear position and the steering angle, and transmit the selected one or more feed segments to the remote operator station through a network at a bitrate higher than a first bitrate and a remaining feed segments of the entire set of feed segments to the remote operator station at a bitrate lesser than a second bitrate. The second bitrate is less than or equal to the first bitrate facilitated by a current network bandwidth associated with transmitting the entire set of feed segments through the network.

Figure 7:
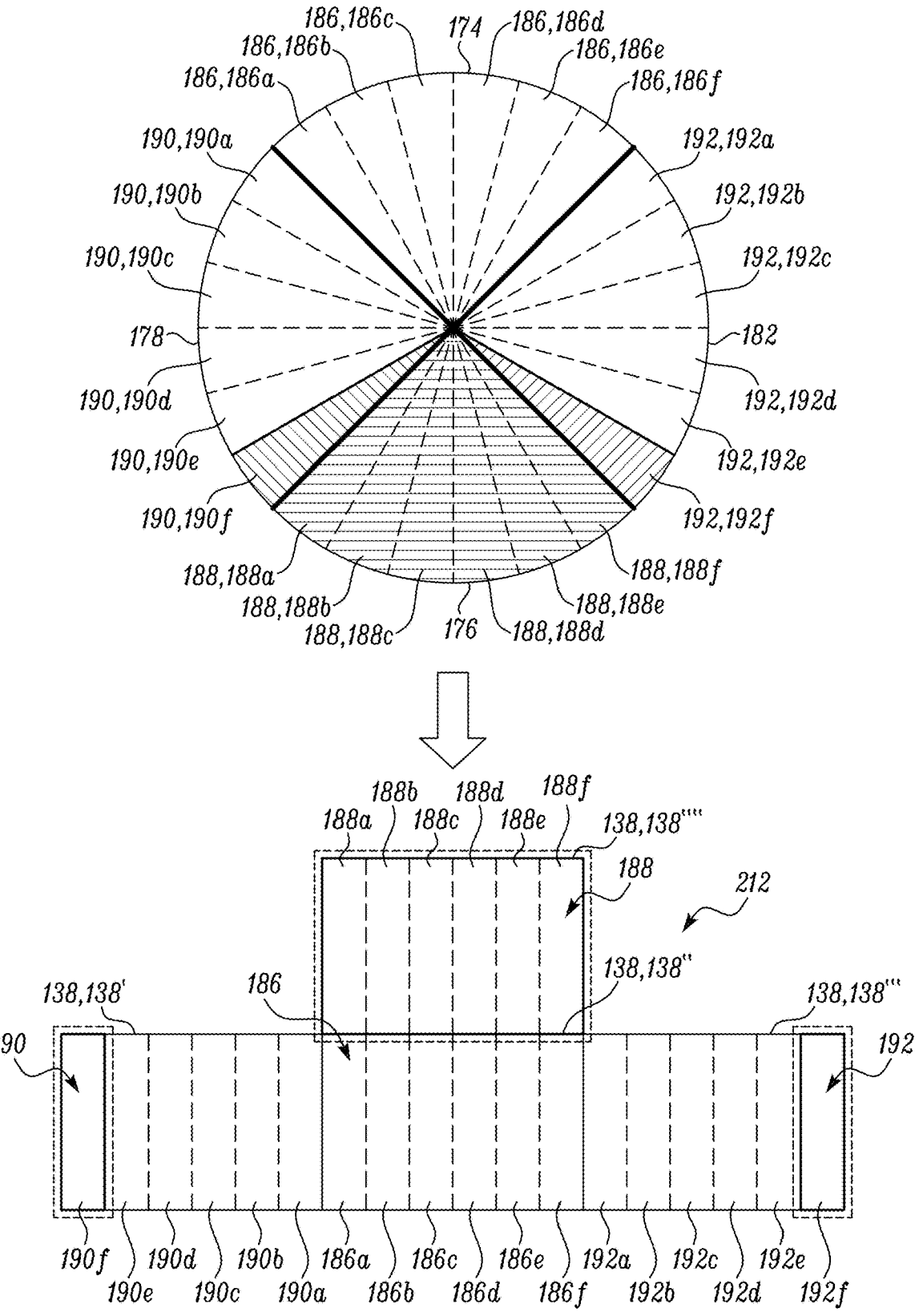
Figure 8:
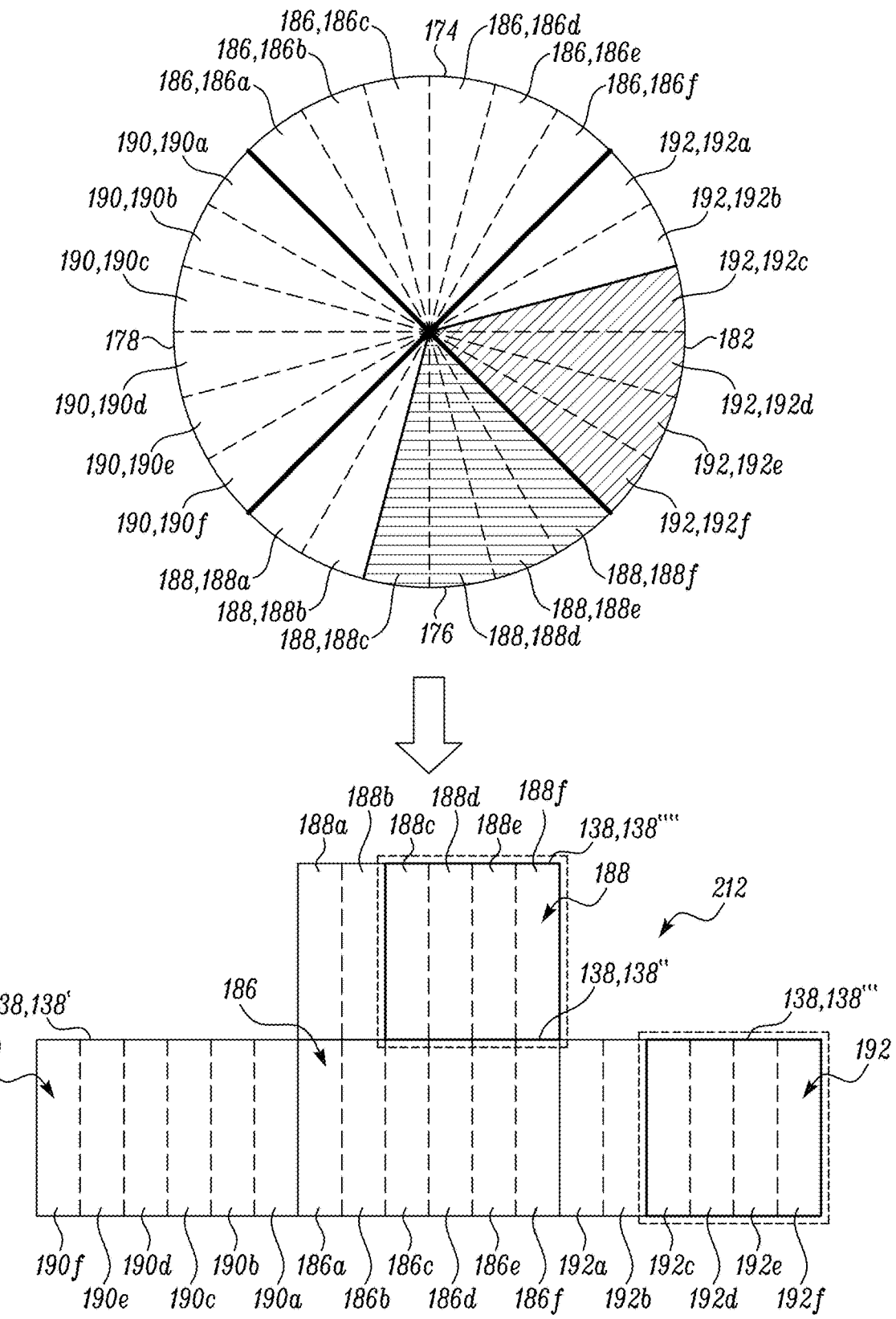
Figure 9:
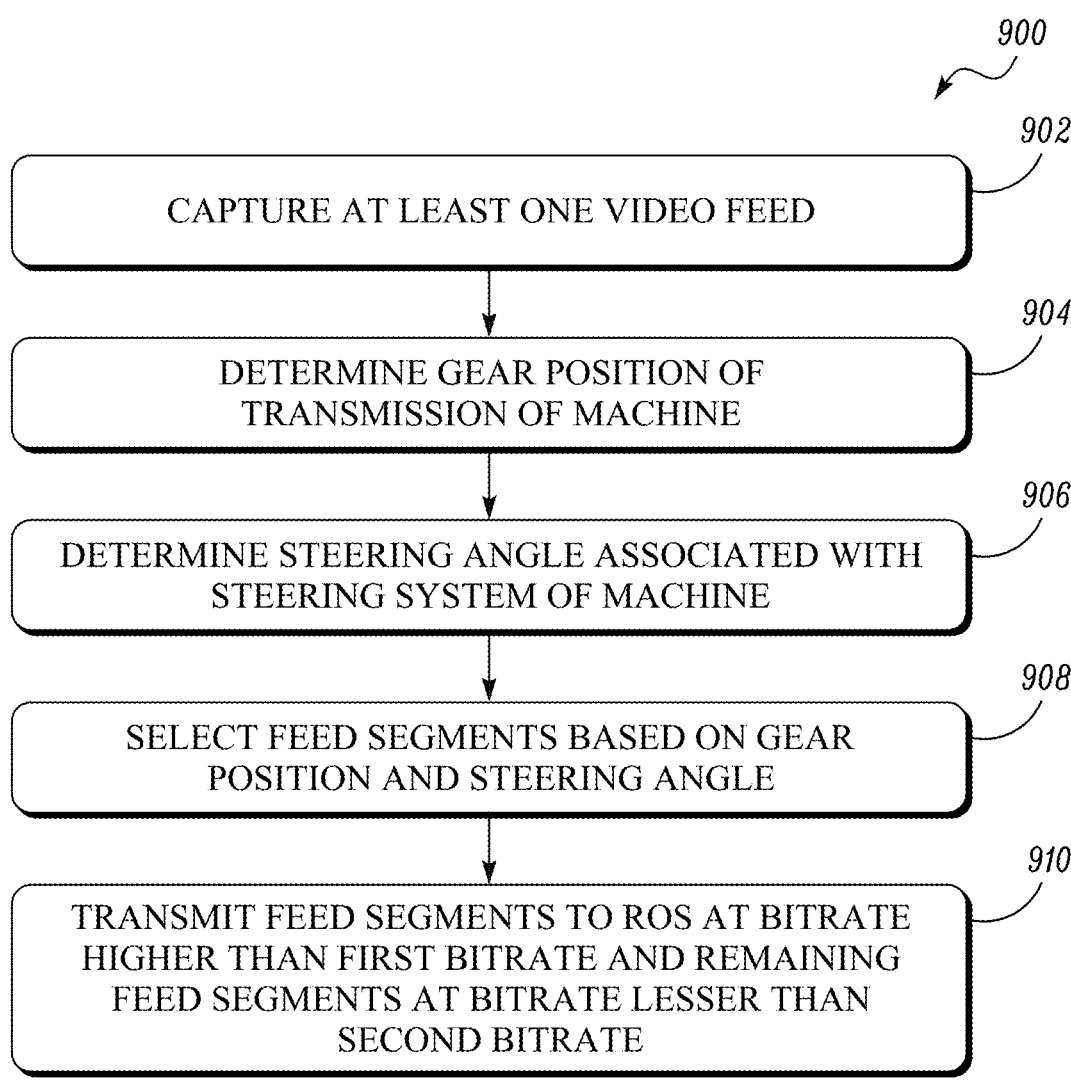

3 moving in the forward and rightward direction, in accordance with another embodiment of the present disclosure;

FIG. 7 illustrates exemplary field of views captured by the four image capturing devices positioned on the machine moving in a reverse direction, in accordance with another embodiment of the present disclosure;

FIG. 8 illustrates exemplary field of views captured by the four image capturing devices positioned on the machine moving in a reverse and rightward direction, in accordance with another embodiment of the present disclosure; and FIG. 9 is a flowchart illustrating an exemplary method for visually monitoring the environment surrounding the machine for facilitating control of the machine from the remote operator station, in accordance with an embodiment of the present disclosure.

DETAILED DESCRIPTION

Reference will now be made in detail to specific embodiments or features, examples of which are illustrated in the accompanying drawings. Wherever possible, the same reference numbers will be used throughout the drawings to refer to the same or the like parts. Generally, corresponding reference numbers may be used throughout the drawings to refer to the same or corresponding parts, e.g., 1, 1', 1", could refer to one or more comparable components used in the same or different depicted embodiments.

Figure 1:
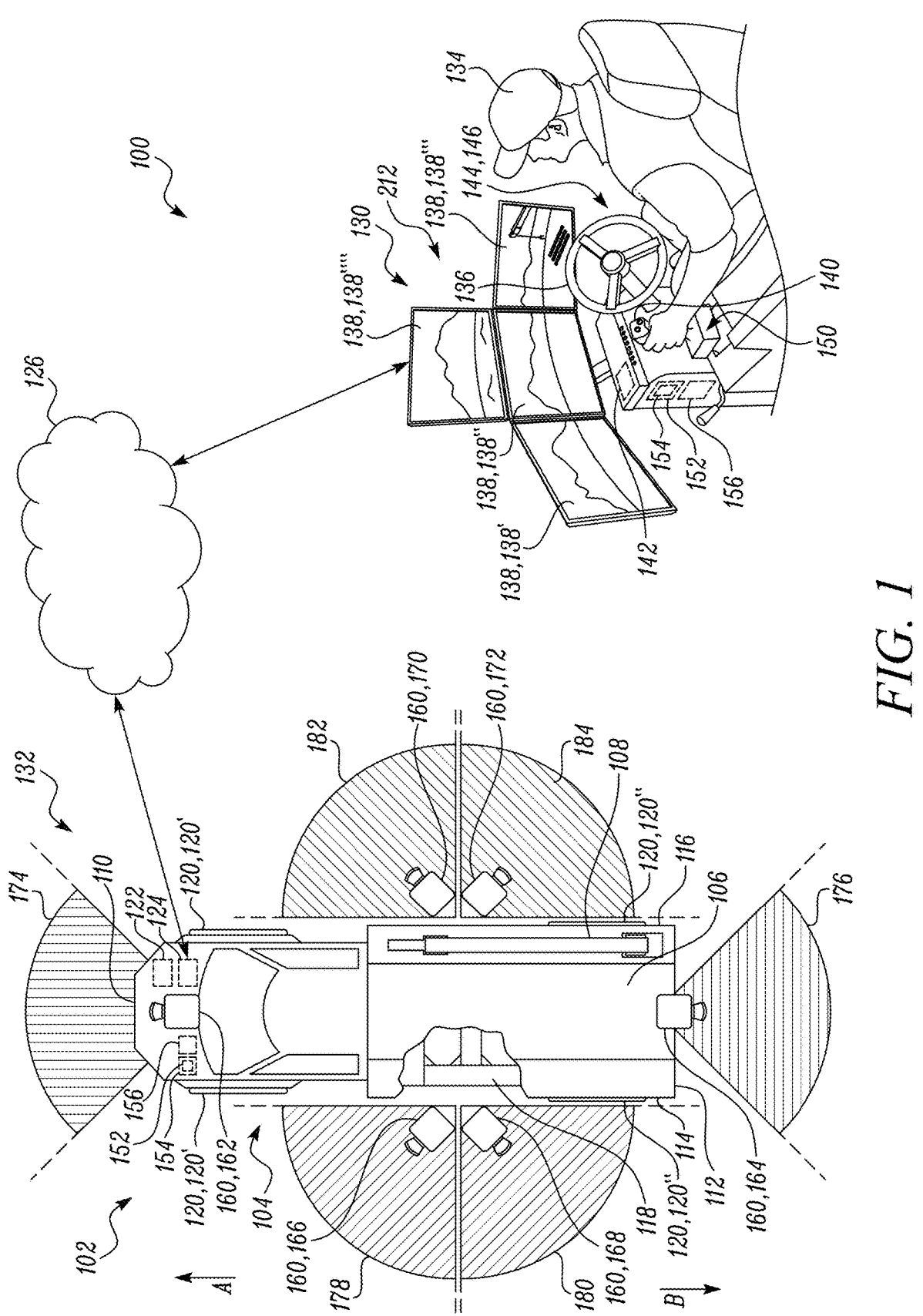
FIG. 1 illustrates a worksite and a remote operator station controlling an exemplary machine at the worksite, in accordance with an embodiment of the present disclosure.

Referring to FIG. 1, an exemplary worksite 100 is shown. The worksite 100 may include any type of worksite known in the art, such as a mining site, a landfill, a quarry, a construction site, and the like. As shown in FIG. 1, a machine 102 may operate at the worksite 100 to accomplish a variety of tasks. In an embodiment as shown in FIG. 1, the machine 102 may include a surface vehicle 104 such as, a pick-up truck. The surface vehicle 104 may include a dump body 106 configured to receive a payload to be transported and an implement, such as, a lifting crane 108 which may be configured for lifting the payload. Although not shown, the machine 102 may be embodied in various mobile machines, including excavators, loaders, compactors, on-highway trucks, off-highway trucks, underground machines like underground wheel loaders, and other mobile machines known in the art. The tasks may be associated with altering geography at the worksite 100 and may include, but are not limited to, dozing tasks, hauling tasks, dumping tasks, loading tasks, and the like.

The machine 102 may define a front end 110 and a rear end 112. The rear end 112 may be located opposite to the front end 110. The front end 110 may lead the rear end 112 when the machine 102 is travelling in a forward direction as shown by directional arrow A in the view of FIG. 1. In some instances, when the machine 102 is travelling in a reverse direction opposite the forward direction, the rear end 112 may lead the front end 110. The reverse direction is shown by directional arrow B in the view of FIG. 1. A left-hand side 114 of the machine 102 and a right-hand side 116 of the machine 102 may be defined on the lateral opposing sides of the machine 102. Said left-hand side 114 and right-hand side 116 can be relatable and understood when viewing the machine 102 from the rear end 112 towards the front end 110.

The machine 102 may include a main frame 118 and multiple traction devices 120. The traction devices 120 may include front traction devices 120' that are located towards the front end 110 of the machine 102 and rear traction devices 120" that are located towards the rear end 112 of the machine 102. The front traction devices 120' may include a set of front tires and the rear traction devices 120" may include a set of rear tires. In examples (not shown), the traction devices 120 can include crawler tracks either alone or in combination with one or more of the set of front tires and/or the set of rear tires. The machine 102 may further include a power system 122, which may include a power source (not shown) such as, but not limited to, an internal combustion engine and/or a battery, to provide motive power to the traction devices 120 at the worksite 100. By providing motive power to the traction devices 120, the traction devices 120 can move with respect to a ground surface (not shown), thus also enabling the machine 102 to move and travel between the various locations of the worksite 100. The machine 102 may further include a machine controller 124 to perform one or more functions associated with the machine 102.

With continued reference to FIG. 1, a remote operator station (ROS) 130 is also described. The ROS 130 may be configured to visually monitor an environment 132 surrounding the machine 102 at the worksite 100. It should be understood that the term "environment", as used herein, may refer to a region, such as a circular or semi-circular field of view encompassing 180-degree, 270 degree, or 360-degree view of the worksite 100 surrounding the machine 102. In an exemplary embodiment, as shown in FIG. 1, the machine 102 is remotely controlled in an autonomous or a semi-autonomous manner, via an operator 134 using one or more devices located at the ROS 130. The devices may include one or more steering wheels 136, at least one display 138, one or more joysticks 140, and the like, access to one or more of which may help the operator 134 to remotely control movements and/or operations of the machine 102. The ROS 130 may be either located at the worksite 100 or at a location that is distant from the worksite 100.

The ROS 130 may include a steering system 144 to control a direction of movement via steering of the machine 102, for example, in a leftward or rightward direction during machine movement. The steering system 144 may include a steering input device 146 including the steering wheel 136 to steer the traction devices 120 and thus the machine 102. Further, the ROS 130 may include a transmission 150 (e.g., a gear box) to control a movement of the machine 102 in the forward or reverse direction. The transmission 150 may include multiple gears, one or more of which can be selectively engaged, to control the motion of the machine 102 to move the machine forward, reverse the machine's movement in a rearward direction, or render the machine in a neutral position i.e., stationary state or even a parked state. For example, forward gear positions and reverse gear positions may cause the machine 102 to attain motion at varying speeds, in the forward direction as shown by directional arrow A in the view of FIG. 1 and the reverse direction as shown by directional arrow B in the view of FIG. 1, respectively. Additionally, a neutral gear position or the parking gear position may prevent the motion of the machine 102 in either direction, for example, when the machine 102 is stationary or parked.

Additionally, the ROS 130 may include an ROS controller 142 to interact with the machine 102 via a network 126 and perform one or more operations associated with controlling the movements and/or operations of the machine 102. Further, the network 126 may include one or more of a local area network (LAN), a wide area network (WAN), a metropolitan area network (MAN), a cellular network or other types of wireless communication networks known to persons skilled in the art.

Referring back to FIG. 1, the ROS 130 may include a steering angle detection system 152 to detect a steering angle associated with the steering system 144 of the machine 102. Although it is disclosed herein that the ROS 130 includes the steering angle detection system 152, in alternative embodiments, the machine 102 may include the steering angle detection system 152 in lieu of the ROS 130 disclosed above. Such alternative configurations of mounting the steering angle detection system 152 are contemplated within the scope of the present disclosure as defined by the appended claims.

The steering angle may correspond to an angular positioning of the steering input device 146 of the steering system 144 during the machine movement. To this end, the steering angle detection system 152 may include a sensor 154 coupled to the steering input device 146 to detect the steering angle of the steering system 144. The sensor 154 may include one or more of an optical sensor, proximity sensor, or any other steering angle sensor capable of detecting a position and rotational speed of the steering input device 146. It will be appreciated by persons skilled in the art that the detection of the steering angle is not limited to the manner described above and can be detected by other known methods. Furthermore, although the steering angle detection system 152 is described as a part of the machine 102 or the ROS 130, it is contemplated that the one or more components of the steering angle detection system 152 may be distributed between the machine 102 and the ROS 130 for detection of the steering angle.

Further, the ROS 130 may include a transmission detection system 156 to detect a gear position of the transmission 150 of the machine 102 during the machine movement and when the machine 102 is stationary. The gear position may correspond to one of forward and reverse in which the machine 102 executes movement in the forward direction as shown by the directional arrow A in the view of FIG. 1 and the reverse direction as shown by the directional arrow B in the view of FIG. 1, respectively. Alternatively, the gear position may correspond to the neutral position or the parking position in which the machine 102 is stationary or parked. The transmission detection system 156 may include one or more devices/components coupled to the transmission 150 to detect the gear position based on a position and engagement of the gears in the transmission 150. For example, the devices/components may include actuating levers, control levers, control shifters, gear levers, gear shift levers, switching levers, shift knobs, or the like. It will be appreciated by persons skilled in the art that the detection of the gear position can be performed by various other known methods. Although it is disclosed herein that the ROS 130 includes the transmission detection system 156, in alternative embodiments, the machine 102 may include the transmission detection system 156 in lieu of the ROS 130 disclosed above. Such alternative configurations of mounting the transmission detection system 156 are contemplated within the scope of the present disclosure as defined by the appended claims. Furthermore, although the transmission detection system 156 is described as a part of the machine 102 or the ROS 130, it is contemplated that the one or more components of the transmission detection system 156 may be distributed between the machine 102 and the ROS 130 for detection of the gear position.

Figure 2:
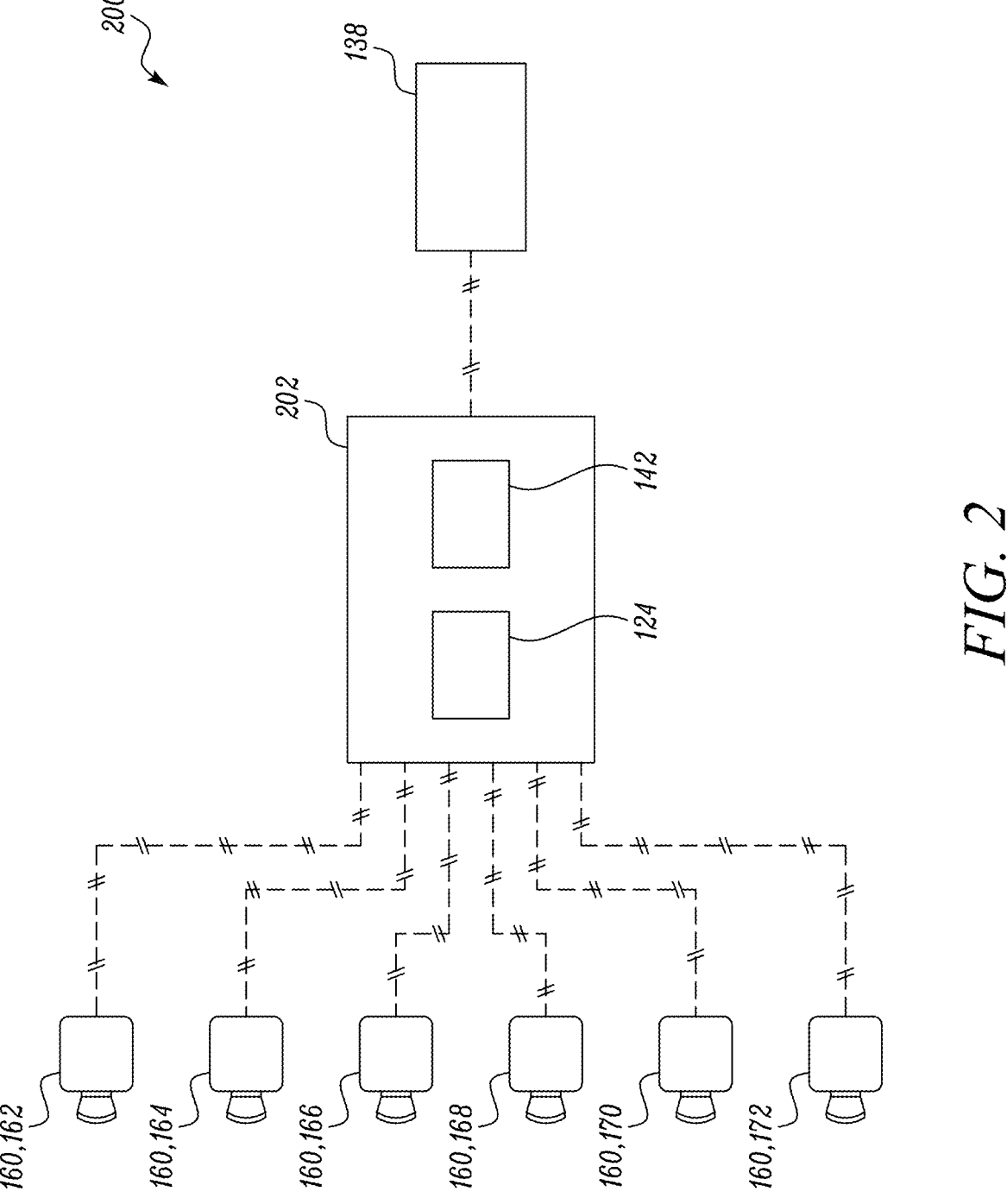
FIG. 2 is a schematic view of a system for visually monitoring an environment surrounding the machine at the worksite for facilitating control of the machine from the remote operator station, in accordance with an embodiment of the present disclosure.

Referring to FIG. 2, a system 200 for visually monitoring the environment 132 surrounding the machine 102 for facilitating control of the machine 102 from the ROS 130 by the operator 134 is described. The system 200 may include at least one image capturing device 160 and a control system 202 coupled to the at least one image capturing device 160.

The at least one image capturing device 160 enables the operator 134 in the ROS 130 to monitor the environment 132 surrounding the machine 102 for facilitating control of the machine 102, as shown in FIG. 1. To this end, the at least one image capturing device 160 is configured to capture at least one video feed visually representative of the environment 132 surrounding the machine 102 at the worksite 100. The video feed may correspond to video streams, time lapse sequences, etc., associated with one or more views of the environment 132 surrounding the machine 102. The view of the environment may provide a view of one half of the Earth, extending from the ground surface into the sky to the horizon, as defined by the plane of the at least one image capturing device 160 when positioned at the ground surface.

The at least one image capturing device 160 may include cameras, such as monochrome digital cameras, high-resolution digital cameras, or any suitable digital cameras. Further, the cameras may include still cameras, camcorders, video cameras, Closed-Circuit Television (CCTV) cameras, and the like, without any limitations. The cameras may also include optical flow chips that facilitate acquisition of the video feeds. In some examples, the camera may embody a Complimentary Metal-Oxide Semiconductor (CMOS) cameras. Although not shown, the at least one image capturing device 160 may include 3-dimensional (3D) sensors, Light Detection and Ranging (LIDAR) sensors, and other devices known to persons skilled in the art, to monitor the environment 132 surrounding the machine 102.

In embodiments, the at least one image capturing device 160 may include a single camera set up (not shown) to capture a field of view of the environment 132 surrounding the machine 102. For example, the field of view may include 360 degrees field of view of the environment 132 surrounding the machine 102. The single camera set-up may be positioned on the machine 102 such as to provide a comprehensive front, rear, left and right view of the environment 132 of the machine 102. To this end, the single camera set-up may include multiple wide-angle lens that captures the field of view of the environment 132 from various angles simultaneously. For example, the single camera set-up may include dual lens configuration where each lens covers at least 180 degrees allowing for a complete 360 degrees field of view of the environment 132. The at least one image capturing device 160 is configured to capture at least one video feed visually representative of the environment 132 surrounding the machine 102 which the operator 134 can use to monitor the environment 132.

In the embodiment shown in FIG. 1, the at least one image capturing device 160 may include a plurality of image capturing devices 160. The plurality of image capturing devices 160 may be configured to capture two or more video feeds at least partially distinct from one another and visually representative of the environment 132 surrounding the machine 102 at the ROS 130. For example, FIG. 1 shows six image capturing devices 160, namely-a first image capturing device 162, a second image capturing device 164, a third image capturing device 166, a fourth image capturing device 168, a fifth image capturing device 170, and a sixth image capturing device 172 are positioned at one or more of the front end 110, the rear end 112, the left-hand side 114, and the right-hand side 116 of the machine 102. For example, the first image capturing device 162 is positioned on the front end 110 of the machine 102, the second image capturing device 164 is positioned on the rear end 112 of the machine 102, the third image capturing device 166 and the fourth image capturing device 168 are positioned on the left-hand side 114 of the machine 102, and the fifth image capturing device 170 and the sixth image capturing device 172 are positioned on the right-hand side 116 of the machine 102. Each of these image capturing devices 162, 164, 166, 168, 170, 172 serves to provide a corresponding video feed partially distinct from the other video feeds which the operator 134 can use to monitor the environment 132 surrounding the machine 102. It may be contemplated that, the plurality of image capturing devices 160 may be mounted at any suitable location of the machine 102 and is not limited to the positions shown in FIG. 1.

Each of the first image capturing device 162, the second image capturing device 164, the third image capturing device 166, the fourth image capturing device 168, the fifth image capturing device 170, and the sixth image capturing device 172 can include a field of view, with each of the fields of view capturing a view of a portion of the environment 132 surrounding the machine 102. The field of view of each of these image capturing devices 162, 164, 166, 168, 170, 172 might have a range of sizes such that a composite field of view of the image capturing devices 162, 164, 166, 168, 170, 172 may be anywhere up to 360 degrees. For example, in the illustrated embodiment shown in FIG. 1, the field of view of each image capturing device 162, 164, 166, 168, 170, 172 may be at least 90 degrees when observed from a top view of the machine 102. In some cases (not shown), the field of view of each image capturing device 162, 164, 166, 168, 170, 172 may be 120 degrees when observed from the top view of the machine 102.

As shown in FIG. 1, the first image capturing device 162 may be configured to capture a first video feed covering a first field of view 174 that may encompass a portion of the environment 132 located towards the front end 110 of the machine 102. The second image capturing device 164 may be configured to capture a second video feed covering a second field of view 176 that may encompass a portion of the environment 132 located towards the rear end 112 of the machine 102. Similarly, the third image capturing device 166 may be configured to capture a third video feed covering a third field of view 178 that may encompass a partial portion of the environment 132 located towards the left-hand side 114 of the machine 102. The fourth image capturing device 168 may be configured to capture a fourth video feed covering a fourth field of view 180 that may encompass another partial portion of the environment 132 located towards the left-hand side 114 of the machine 102. In addition, the fifth image capturing device 170 may be configured to capture a fifth video feed covering a fifth field of view 182 that may encompass a partial portion of the environment 132 located towards the right-hand side 116 of the machine 102. The sixth image capturing device 172 may be configured to capture a sixth video feed covering a sixth field of view 184 that may encompass another portion of the environment 132 located towards the right-hand side 116 of the machine 102. The first field of view 174, the second field of view 176, the third field of view 178, the fourth field of view 180, the fifth field of view 182, and the sixth field of view 184 may combinedly provide 360-degree coverage of the environment 132 surrounding the machine 102.

The field of view 174, 176, 178, 180, 182, 184 of an image capturing device 160 of the plurality of image capturing devices 160 may be adjacent to the field of view 174, 176, 178, 180, 182, 184 of another image capturing device 160 of the plurality of image capturing devices 160 to provide a continuous coverage of the environment 132 surrounding the machine 102. For example, the third field of view 178 of the third image capturing device 166 may be adjacent to the fourth field of view 168 of the fourth image capturing device 168. The field of view of the image capturing devices 162, 164, 166, 168, 170, 172 may overlap (not shown) to provide 360-degree coverage of the environment 132 surrounding the machine 102. For example, the first field of view 174 may overlap with the third field of view 178 and the fifth field of view 182, and the second field of view 176 may overlap with the fourth field of view 180 and the sixth field of view 184. In some cases, the third field of view 178 may overlap with the fourth field of view 180 and the fifth field of view 182 may overlap with the sixth field of view 184.

In embodiments, a higher or lower number of the image capturing devices 162, 164, 166, 168, 170, 172 may be positioned on the machine 102. For example, in embodiments shown in FIGS. 5 through 8, a total of four image capturing devices are utilized such that the composite field of view of the four image capturing devices 160 may be anywhere up to 360 degrees. To achieve such a configuration, the fourth image capturing device 168 and the sixth image capturing device 172 may be omitted and the size of the field of view of each of the remaining image capturing devices 162, 164, 166, 170 may be at least 90 degrees. Also, in such cases, the first image capturing device 162, the second image capturing device 164, the third image capturing device 166, and the fifth image capturing device 170 may be positioned onto a single structure of the machine 102 such that a 360 degrees view of the environment 132 is wholly captured without losing any environment features. For example, the single structure may include a pole (not shown) mounted on the machine 102.

The at least one video feed captured by the at least one image capturing device 160 is split into multiple feed segments, for example, vertical feed segments. To this end, each frame of the at least one video feed is split into the multiple feed segments. Each feed segment may represent a different vertical portion of the corresponding frame. Each frame is split in a manner such that when the multiple feed segments of the corresponding frame are combined, they reconstruct the complete frame. The at least one video feed may be split into the multiple feed segments by any controller, for example, the machine controller 124 depending upon requirements of the system 200. The number of multiple feed segments may correspond to a first predefined number that can be determined by a user, for example, the operator 134 and can vary depending upon the requirements of the system 200.

Figure 3:
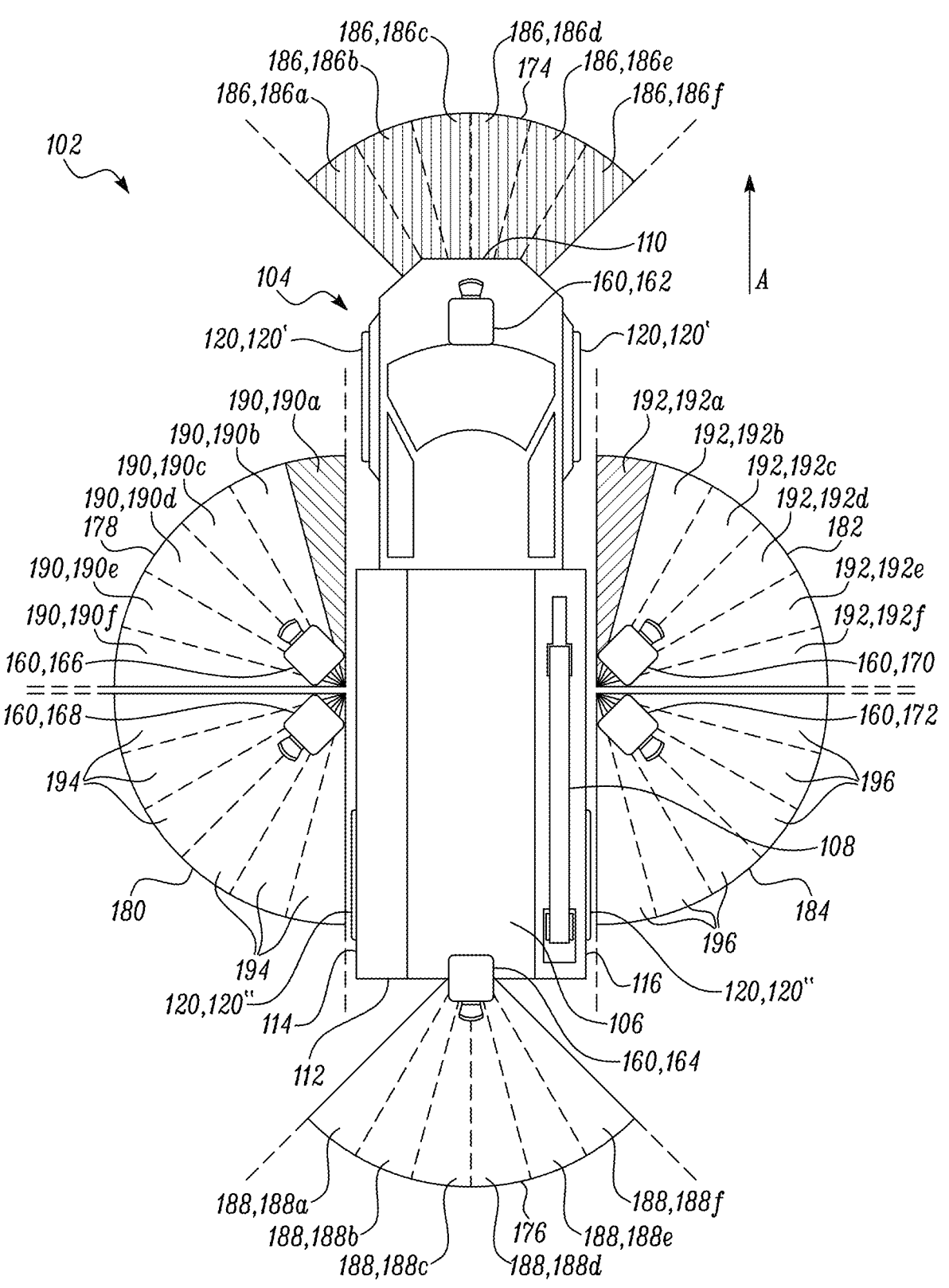
FIG. 3 illustrates exemplary field of views captured by six image capturing devices positioned on the machine moving in a forward direction, in accordance with an embodiment of the present disclosure.
Figure 4:
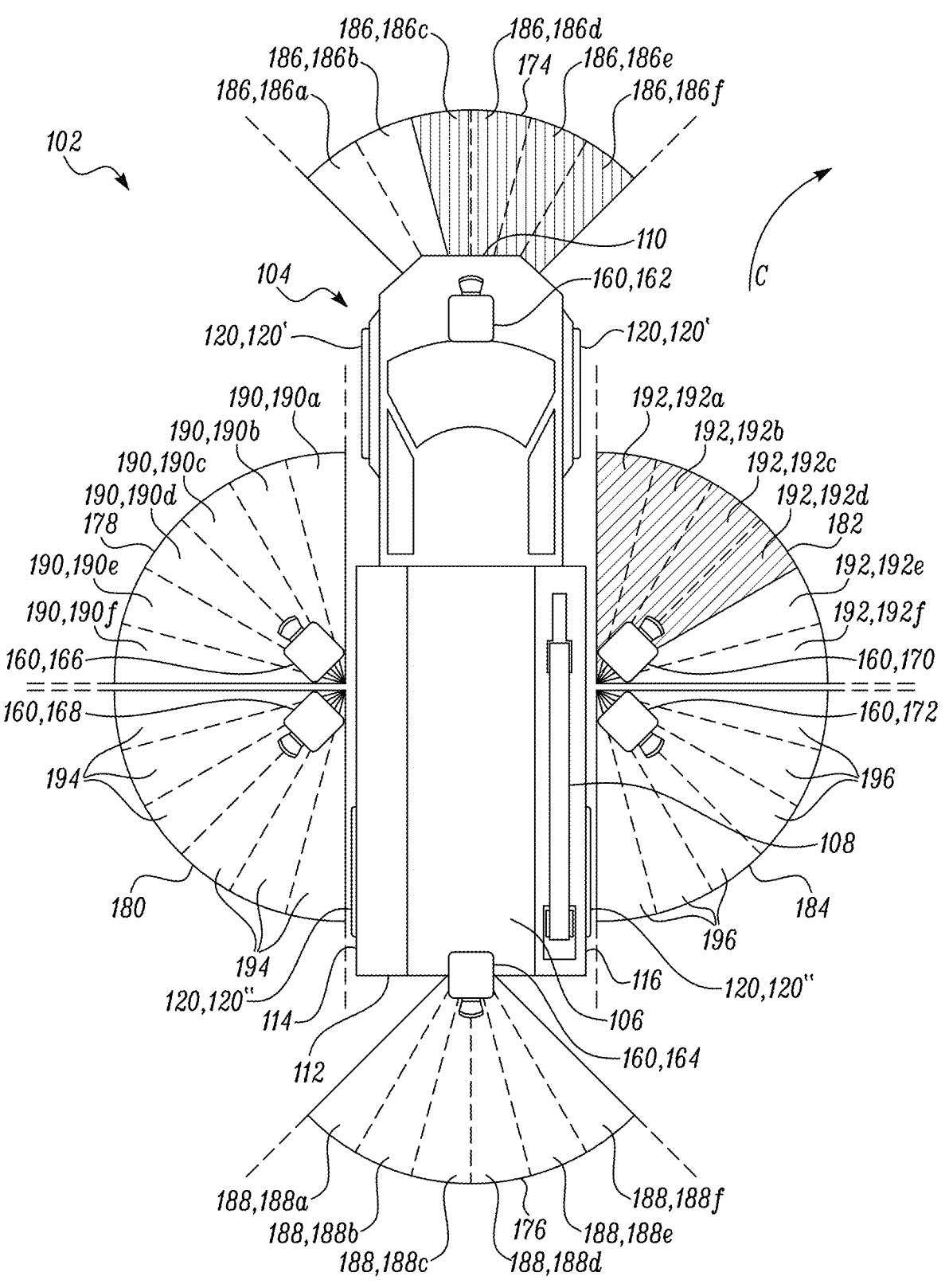
FIG. 4 illustrates exemplary field of views captured by the six image capturing devices positioned on the machine moving in a forward and rightward direction, in accordance with an embodiment of the present disclosure.

When the at least one image capturing device 160 includes the image capturing devices 162, 164, 166, 168, 170, 172, each of the first video feed, the second video feed, the third video feed, the fourth video feed, the fifth video feed, and the sixth video feed is split into multiple feed segments. To this end, each frame of the first video feed, the second video feed, the third video feed, the fourth video feed, the fifth video feed, and the sixth video feed is split into the multiple feed segments. For example, FIGS. 3 and 4 illustrate each of the first video feed, the second video feed, the third video feed, the fourth video feed, the fifth video feed, and the sixth video feed divided into six feed segments 186, 188, 190, 194, 192, 196 respectively. Similarly, FIGS. 5 through 8 illustrate each of the first video feed, the second video feed, the third video feed, and the fifth video feed divided into six feed segments 186, 188, 190, 192, respectively. The feed segments 186, 188, 190, 194, 192, 196 are shown in the first field of view 174, the second field of view 176, the third field of view 178, the fourth field of view 180, the fifth field of view 182, and the sixth field of view 184 of FIGS. 3 through 8 for ease of understanding and clarity, and it is to be understood that the feed segments 186, 188, 190, 194, 192, 196 are meant to be displayed on the at least one display 138 of the ROS 130.

Referring back to FIG. 2, the system 200 further includes a control system 202 coupled to the at least one image capturing device 160. The control system 202 may include one or more of the machine controller 124 of the machine 102 and optionally may also include the ROS controller 142 of the ROS 130 communicatively coupled to the machine controller 124. The control system 202, for example, the machine controller 124 is configured to receive the at least one video feed from the at least one image capturing device 160. The machine controller 124 may be configured to receive the at least one video feed from the at least one image capturing device 160, e.g., by electrical transmission/translation means, which may exemplarily include a wired, a wireless communication network, and/or data links, such as a (Controller Area Network) CAN data links (not shown). When the at least one image capturing device 160 includes the image capturing devices 162, 164, 166, 168, 170, 172, the machine controller 124 may be configured to receive the first video feed from the first image capturing device 162, the second video feed from the second image capturing device 164, the third video feed from the third image capturing device 166, the fourth video feed from the fourth image capturing device 168, the fifth video feed from the fifth image capturing device 170, and the sixth video feed from the sixth image capturing device 172. In the embodiments shown in FIGS. 5 through 8, the machine controller 124 may be configured to receive the first video feed, the second video feed, the third video feed, and the fifth video feed.

The control system 202, for example, the machine controller 124 or the ROS controller 142 may be configured to determine the gear position of the transmission 150 of the machine 102 during the machine movement. For example, the control system 202 may be configured to determine the gear position based on the gear position detected by the transmission detection system 156. Further, the control system 202, for example, the machine controller 124 or the ROS controller 142 may be configured to determine the steering angle associated with the steering system 144 of the machine 102 during the machine movement. For example, the control system 202 may be configured to determine the steering angle based on the steering angle detected by the steering angle detection system 152.

The control system 202, for example, the machine controller 124 may be further configured to detect a current bandwidth value associated with the network 126. The bandwidth value represents a maximum data transfer capacity of the network 126 to transfer data, for example, the video feeds from the machine 102 to the ROS 130. The machine controller 124 may be configured to detect whether the current bandwidth value recedes below a threshold bandwidth value. The threshold bandwidth value may be defined by a user, for example, the operator 134, and can vary depending upon the requirements of the system 200.

When the current bandwidth value recedes below the threshold bandwidth value, the machine controller 124 may be configured to select one or more feed segments from an entire set of feed segments based on the gear position and the steering angle. The entire set of feed segments corresponds to the multiple feed segments of the at least one video feed from the at least one image capturing device 160. As used herein, the term 'multiple feed segments' would typically refer to adjacently located feed segments from any one or, single, image capturing device 160. However, it is to be understood that where multiple image capturing devices 160 are deployed or used, the term 'multiple feed segments' can refer to adjoining multiple feed segments from two or more adjacently located image capturing devices 160. For example, when the at least one image capturing device 160 includes the image capturing devices 162, 164, 166, 168, 170, 172, the entire set of feed segments includes the adjoining multiple feed segments from each of the one or more video feeds from the image capturing devices 162, 164, 166, 168, 170, 172. For example, in the embodiments shown in FIGS. 3 and 4, the entire set of feed segments includes the feed segments 186a, 186b, 186c, 186d, 186e, 186f of the first video feed, the feed segments 190a, 190b, 190c, 190d, 190e, 190f of the third video feed, the feed segments 194 of the fourth video feed, the feed segments 188a, 188b, 188c, 188d, 188e, 188f of the second video feed, the feed segments 192a, 192b, 192c, 192d, 192e, 192f of the fifth video feed, and the feed segments 196 of the sixth video feed. Similarly, in the embodiments shown in FIGS. 5 through 8, the entire set of feed segments includes the feed segments 186a, 186b, 186c, 186d, 186e, 186f of the first video feed, the feed segments 190a, 190b, 190c, 190d, 190e, 190f of the third video feed, the feed segments 188a, 188b, 188c, 188d, 188e, 188f of the second video feed, and the feed segments 192a, 192b, 192c, 192d, 192e, 192f of the fifth video feed.

The selected one or more feed segments may correspond to portions in a field of view 212 (shown in FIGS. 1 and 5 through 8) that enable a visualization of a region in a direction towards which the machine movement is executed. As will be described in greater detail below, the field of view 212 represents the entire set of feed segments consecutively arranged one after the other in a series on the at least one display 138 to enable the operator 134 to visually monitor the environment 132.

Referring back to FIG. 2, the machine controller 124 may be configured to select the one or more feed segments based on the gear position and the steering angle such that the one or more feed segments corresponds to the region in the direction towards which the machine movement is executed. For example, when the machine controller 124 determines that the machine movement is executed in the forward direction based on the determined gear position, the machine controller 124 may be configured to select one or more feed segments capturing a region in the forward direction of the machine 102. For example, the machine controller 124 may be configured to select the one or more feed segments capturing the portion of the environment 132 located towards the front end 110 of the machine 102. Similarly, when the machine controller 124 determines that the machine movement is executed in the reverse direction based on the determined gear position, the machine controller 124 may be configured to select one or more feed segments capturing a region in the reverse direction of the machine 102. For example, the machine controller 124 may be configured to select the one or more feed segments capturing the portion of the environment 132 located towards the rear end 112 of the machine 102.

Figure 5:
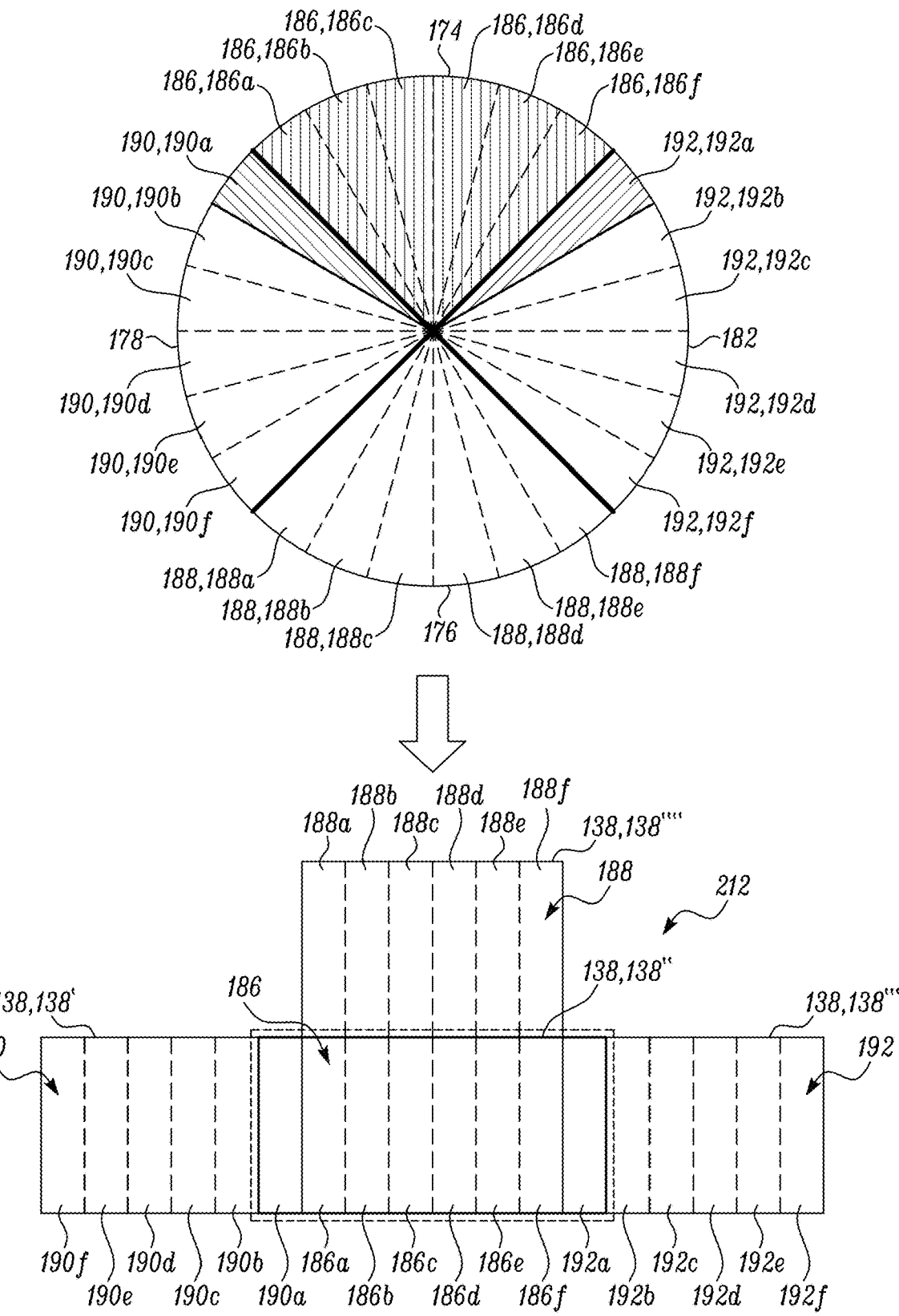
FIG. 5 illustrates exemplary field of views captured by four image capturing devices positioned on the machine moving in the forward direction, in accordance with another embodiment of the present disclosure.

In the embodiments shown in FIGS. 3 and 5 when the machine movement is executed in the forward direction, the machine controller 124 may be configured to select one or more feed segments 186 of the first video feed capturing the portion of the environment 132 located towards the front end 110 of the machine 102. For example, the machine controller 124 may be configured to select one or more feed segments 186a, 186b, 186c, 186d, 186e, 186f of the first video feed.

In some instance, the machine controller 124 may also be configured to select at least one feed segment of the adjacent third video feed capturing the partial portion of the environment 132 located towards the left-hand side 114 and the fifth video feed capturing the partial portion of the environment 132 located towards the right-hand side 116 of the machine 102 along with the feed segments 186. For example, the machine controller 124 may also be configured to select the feed segments 190*a* and 192*a* of the adjacent third video feed and fifth video feed, respectively, of the machine 102 along with the feed segments 186.

In the embodiment shown in FIG. 7, when the machine movement is executed in the reverse direction, the machine controller 124 may be configured to select one or more feed segments 188 of the second video feed capturing the portion of the environment 132 located towards the rear end 112 of the machine 102. For example, the machine controller 124 may be configured to select the feed segments 188*a*, 188*b*, 188*c*, 188*d*, 188*e*, 188*f* of the second video feed. In some instances, the machine controller 124 may also be configured to select at least one feed segment of the adjacent third video feed capturing the partial portion of the environment 132 located towards the left-hand side 114 and fifth video feed capturing the partial portion of the environment 132 located towards the right-hand side 116, respectively, of the machine 102 along with the feed segments 188. For example, the machine controller 124 may be configured to select the feed segments 190*f* and 192*f* of the adjacent third video feed and fifth video feed, respectively, of the machine 102 along with the feed segments 188.

Referring back to FIG. 2, when the machine controller 124 determines that the machine movement is executed in a forward and leftward direction based on the gear position and the steering angle, the machine controller 124 may be configured to select one or more feed segments corresponding to a region in the forward and leftward direction of the machine 102. For example, the machine controller 124 may be configured to select the feed segments corresponding to a region towards the front end 110 and the left-hand side 114 of the machine 102. Similarly, when the machine controller 124 determines that the machine movement is executed in a forward and rightward direction based on the gear position and the steering angle, the machine controller 124 may be configured to select one or more feed segments corresponding to a region in the forward and rightward direction of the machine 102. For example, the machine controller 124 may be configured to select the feed segments corresponding to a region towards the front end 110 and the right-hand side 116 of the machine 102. The forward and rightward direction is shown by directional arrow C in the view of FIG. 4.

Figure 6:
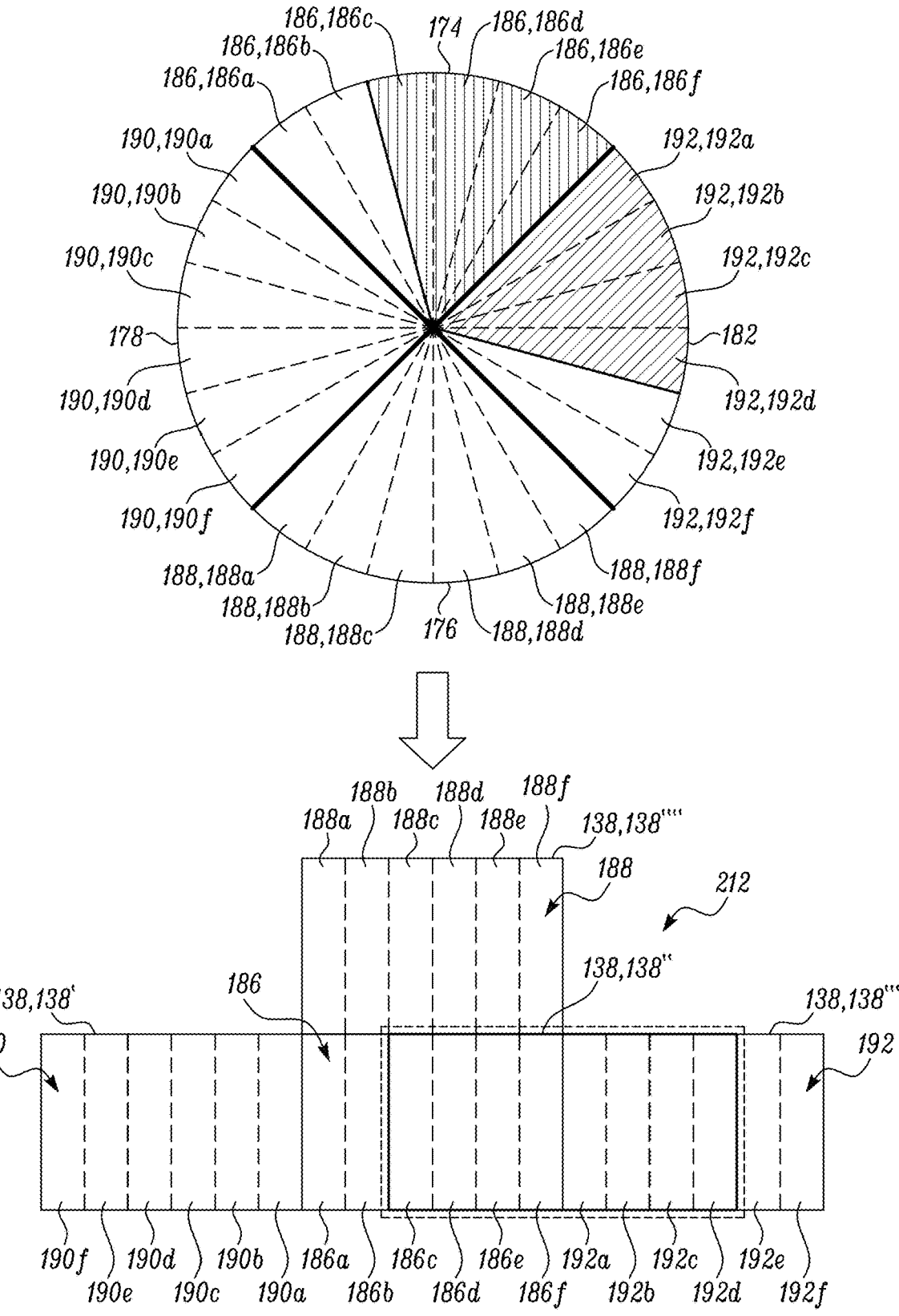
FIG. 6 illustrates exemplary field of views captured by the four image capturing devices positioned on the machine

For example, in the embodiments shown in FIGS. 4 and 6, when the machine 102 is moving in the forward and rightward direction shown by the directional arrow C in the view of FIG. 4, the machine controller 124 may be configured to select one or more feed segments 186*c*, 186*d*, 186*e*, 186*f* of the feed segments 186 of the first video feed and one or more feed segments 192*a*, 192*b*, 192*c*, 192*d* of the feed segments 192 of the fifth video feed to combinedly capture the region in the forward and rightward direction of the machine 102.

Referring back to FIG. 2, when the machine controller 124 determines that the machine movement is executed in a reverse and leftward direction based on the gear position and the steering angle, the machine controller 124 may be configured to select one or more feed segments capturing a region in the reverse and leftward direction of the machine 102. For example, the machine controller 124 may be configured to select the feed segments capturing a region towards the rear end 112 and the left-hand side 114 of the machine 102. Similarly, when the machine controller 124 determines that the machine movement is executed in a reverse and rightward direction based on the gear position and the steering angle, the machine controller 124 may be configured to select one or more feed segments corresponding to a region in the reverse and rightward direction of the machine 102. For example, the machine controller 124 may be configured to select the feed segments corresponding to a region towards the rear end 112 and the right-hand side 116 of the machine 102.

For example, in the embodiment shown in FIG. 8, when the machine 102 is moving in the reverse and rightward direction, the machine controller 124 may be configured to select one or more feed segments 188*c*, 188*d*, 188*e*, 188*f* of the feed segments 188 of the second video feed and one or more feed segments 192*f*, 192*e*, 192*d*, 192*c* of the feed segments 192 of the fifth video feed to combinedly capture the region in the reverse and rightward direction of the machine 102.

The machine controller 124 may be configured to determine a number of the one or more feed segments based on a request generated at the ROS 130 by the operator 134. The number of the one or more feed segments determined based on the request generated at the ROS 130 is hereinafter interchangeably referred to as a second predefined number of feed segments. The request may indicate the field of view required by the operator 134, hereinafter interchangeably referred to as operator field of view. The operator field of view corresponds to a field of view of the environment 134 required by the operator 134 to effectively control and operate the machine 102. The operator field of view can be determined by the operator 134 depending on various factors, including but not limited to, the direction of the movement of the machine 102 and the environment 132 surrounding the machine 102.

To this end, the machine controller 124 may be configured to determine the second predefined number of feed segments based on the operator field of view and a field of view of each segment. Assuming that the field of view of the at least one image capturing device 160 is 360 degrees and the first predefined number is twenty-four (24). In such cases, the field of view of each segment, i.e., 15 degrees, may be obtained by dividing the field of view of the at least one image capturing device 160 by the first predefined number i.e., 360 divided by 24. In another example with the plurality of image capturing devices 160, assuming that the field of view 174, 176, 178, 180, 182, 184 of each image capturing device 160 is 90 degrees and the first predefined number is six (6), the field of view of each segment, i.e., 15 degrees, may be obtained by dividing the field of view of the image capturing device 160 by the first predefined number i.e., 90 divided by 6. In such cases, to obtain the operator field of view corresponding to 120 degrees, the second predefined number may correspond to 8, obtained by dividing 120 by 15. Similarly, to obtain the operator field of view corresponding to 75 degrees, the second predefined number may correspond to 5, obtained by dividing 75 by 15.

In the embodiments when the machine 102 is moving in the forward direction (as shown in FIGS. 3 and 5), the machine controller 124 may be configured to select eight feed segments, each with 15 degrees field of view, to provide a total of 120 degrees operator field of view of the environment 132 located towards the front end 110 of the machine 102. For example, the machine controller 124 may be configured to select the feed segments 190*a* and 192*a* along with the feed segments 186a, 186b, 186c, 186d, 186e, 186f to provide a total of 120 degrees operator field of view of the environment 132 located towards the front end 110 of the machine 102. Similarly, in the embodiments when the machine 102 is moving in the reverse direction (as shown in FIG. 7), the machine controller 124 may be configured to select eight feed segments, each with 15 degrees field of view, to provide a total of 120 degrees operator field of view of the environment 132 located towards the rear end 112 of the machine 102. For example, the machine controller 124 may be configured to select the feed segments 190f and 192f along with the feed segments 188a, 118b, 188c, 188d, 188e, 188e, 188f, each with 15 degrees field of view, to provide a total of 120 degrees operator field of view of the environment 132 located towards the rear end 112 of the machine 102.

Similarly, in the embodiments shown in FIGS. 4 and 6, when the machine 102 is moving in the forward and rightward direction shown by the directional arrow C in the view of FIG. 4, the machine controller 124 may be configured to select eight feed segments to provide a total of 120 degrees operator field of view of the environment 132 in the forward and rightward direction of the machine 102. For example, the machine controller 124 may be configured to select four feed segments 186c, 186d, 186e, 186f of the feed segments 186 of the first video feed and four feed segments 192a, 192b, 192c, 192d of the feed segments 192 of the fifth video feed to provide a total of 120 degrees operator field of view of the environment 132 in the forward and rightward direction of the machine 102. Similarly, in the embodiment shown in FIG. 8, when the machine 102 is moving in the reverse and rightward direction, the machine controller 124 may be configured to select eight feed segments to provide a total of 120 degrees operator field of view of the environment 132 in the reverse and rightward direction of the machine 102. For example, the machine controller 124 may be configured to four feed segments 188c, 188d, 188e, 188f of the feed segments 188 of the second video feed and four feed segments 192f, 192e, 192d, 192c of the feed segments 192 of the fifth video feed to combinedly provide a total of 120 degrees operator field of view of the environment 132 in the reverse and rightward direction of the machine 102.

Similarly, when the field of view of the at least one image capturing device 160 is 180 degrees (not shown) and the first predefined number corresponds to 6, the field of view of each segment may correspond to 30 degrees, obtained by dividing 180 by 6. To obtain the operator field of view corresponding to 120 degrees, the second predefined number may correspond to 4, obtained by dividing 120 by 30. In such cases, the machine controller 124 may be configured to select 4 feed segments of the at least one video feed from the at least one image capturing device 160. When the field of view 174, 176, 178, 180, 182, 184 of each image capturing device 150 of the plurality of image capturing devices 160 is 120 degrees (not shown) and the first predefined number is six, the field of view of each segment may correspond to 20 degrees, obtained by dividing 120 by 6. To obtain the operator field of view corresponding to 120 degrees, the second predefined number may correspond to 6, obtained by dividing 120 by 20. In such cases, the machine controller 124 may be configured to select all 6 feed segments of a single image capturing device 160 or a total of 6 feed segments selected based on adjacent feed segments of two or more of the plurality of image capturing devices 160.

The control system 202, for example, the machine controller 124 may be configured to transmit the one or more feed segments to the ROS 130 through the network 126 at a bitrate higher than a first bitrate and a remaining feed segments of the entire set of feed segments to the ROS 130 at a bitrate lesser than a second bitrate. To this end, the machine controller 124 may be configured to allocate a minimum threshold of network bandwidth for dedicated transmission of the one or more feed segments at at least the first bitrate and a remaining percentage of network bandwidth for transmitting the remaining feed segments at at least the second bitrate. In such cases, the second bitrate is selected to lower than or equal to the first bitrate. The first bitrate and the second bitrate may be defined by the user, for example, the operator 134, and can vary depending upon the requirements of the system 200. The second bitrate is less than or equal to the first bitrate facilitated by a current network bandwidth associated with transmitting the entire set of feed segments through the network 126. In embodiments when the gear position is either of the neutral position or the parking position (not shown), the machine controller 124 may be configured to transmit the entire set of feed segments to the ROS 130 with same bitrate or with a bitrate defined within a bitrate range.

The control system 202, for example, the machine controller 124 may be configured to dynamically throttle the bitrate of transmission of one or more adjacently located feed segments of the multiple feed segments captured by any one, or single, image capturing device 160 of the at least one image capturing device 160 based on the steering angle and the gear position. For example, when the machine 102 is moving in a first direction, the control system 202 may be configured to transmit the one or more adjacently located feed segments of the multiple feed segments capturing the portion of the environment 132 located towards the first direction of the machine 102 at the bitrate higher than the first bitrate and the remaining feed segments of the multiple feed segments at the bitrate lesser than the second bitrate. However, when the machine 102 changes its direction from the first direction to a second direction, the control system 202 may be configured to increase the bitrate of the transmission of the one or more adjacently located feed segments of the multiple feed segments capturing the portion of the environment 132 located towards the second direction of the machine 102 to the first bitrate and reduce the bitrate of the transmission of the one or more feed segments of the multiple feed segments capturing the portion of the environment 132 located towards the first direction of the machine 102 to the second bitrate. In another embodiment, the control system 202, for example, the machine controller 124 may be configured to dynamically throttle the bitrate of transmission of one or more adjacently located feed segments of the entire set of feed segments based on the steering angle and the gear position. For example, when the machine 102 is moving in the first direction, the control system 202 may be configured to transmit the one or more adjacently located feed segments of the entire set of feed segments capturing the portion of the environment 132 located towards the first direction of the machine 102 at the bitrate higher than the first bitrate and the remaining feed segments of the entire set of feed segments at the bitrate lesser than the second bitrate. However, when the machine 102 changes its direction from the first direction to a second direction, the control system 202 may be configured to increase the bitrate of the transmission of the one or more adjacently located feed segments of the entire set of feed segments capturing the portion of the environment 132 located towards the second direction of the machine 102 to the first bitrate and reduce the bitrate of the transmission of the feed segments of the entire set of feed segments capturing the portion of the environment 132 located towards the first direction of the machine 102 to the second bitrate. In the example illustrated in FIG. 3, when the machine 102 is moving in the forward direction as shown by directional arrow A, the control system 202 may be configured to transmit the feed segments 190*a*, 186*a*, 186*b*, 186*c*, 186*d*, 186*e*, 186*f*, 192*a* at the bitrate higher than the first bitrate and the remaining feed segments at the bitrate lesser than the second bitrate. However, when the machine 102 changes its direction from the forward direction to the forward and rightward direction shown by the directional arrow C in the view of FIG. 4, the control system 202 may be configured to reduce the bitrate of the transmission of the feed segments 190*a*, 186*a*, 186*b* to the second bitrate and increase the bitrate of the transmission of the feed segments 192*b*, 192*c*, 192*d* to the first bitrate.

Subsequent to the transmission of the one or more feed segments, the control system 202, for example, the ROS controller 142 may be configured to display the one or more feed segments and the remaining feed segments together to form the field of view 212 (shown in FIG. 1) of the machine 102 for display on the at least one display 138 of the ROS 130. To this end, the ROS controller 142 may be configured to consecutively arrange the one or more feed segments and the remaining feed segments one after the other in a series in the field of view 212 on the at least one display 138 of the ROS 130. For example, the ROS controller 142 may display the feed segment 190*a* with the feed segment 190*b* and the feed segment 192*a* with the feed segment 192*b* in the field of view 212. In some embodiments as shown in FIGS. 1 and 5 through 8, when the ROS 130 include more than one displays 138 such as, a left display 138', a front display 138", a right display 138''', and a rear display 138'''', the ROS controller 142 may be configured to divide the consecutive arrangement of the one or more feed segments and the remaining feed segments of the field of view 212 across the left display 138', the front display 138", the right display 138''', and the rear display 138'''' of the plurality of displays 138 of the ROS 130.

The machine controller 124 and the ROS controller 142 may be one or more processor, a microprocessor, a microcontroller, an electronic control module (ECM), an electronic control unit (ECU), or any other suitable means for performing the one or more operations described above. The machine controller 124 and the ROS controller 142 may be implemented using one or more controller technologies, such as Application Specific Integrated Circuit (ASIC), Reduced Instruction Set Computing (RISC) technology, Complex Instruction Set Computing (CISC) technology or any other similar technology now known or developed in the future. In some embodiments, the set of instructions may be provided in any computer readable media, e.g., any non-transitory computer readable media, and which when executed by the machine controller 124 or the ROS controller 142 may result in one or more of the functions of the respective machine controller 124 or ROS controller 142 as described above.

Each of the machine controller 124 and the ROS controller 142 may include a memory (not shown), for example, a hard disk drive (HDD) and a secure digital (SD) card. Further, the memory may include non-volatile/volatile memory units such as a random-access memory (RAM)/a read only memory (ROM), which may include associated input and output buses. The memory may be configured to store various other instructions sets for various other functions of the machine 102, along with the set of instructions, described above.

INDUSTRIAL APPLICABILITY

When transmitting the video feeds from the at least one image capturing device 160 positioned on the machine 102 to the ROS 130, resolution and quality of the at least one video feed must be optimized for the operator 134 located at the ROS 130 to properly monitor the environment 132 surrounding the machine 102 and accordingly, perform operations. However, transmission of the video feed over the network 126 may experience degradation in the resolution and quality during network instability and low bandwidth conditions. Such degradation in the resolution and quality of video feeds may lead to packet loss and potential image distortion, thereby preventing the operator 134 from properly viewing the environment 132 surrounding the machine 102. The present disclosure provides the system 200 to facilitate the visual monitoring of the environment 132 of the machine 102 during such network instability and low bandwidth conditions by optimizing a bitrate of the transmission of the one or more feed segments determined based on the gear position and the steering angle of the machine 102. By selecting the one or more feed segments from the entire set of feed segments based on the gear position and the steering angle and transmitting the selected feed segments at a higher bitrate, the system 200 ensures optimized visualization of the region in the direction towards the machine movement. This facilitates accommodation of bandwidth constraints associated with transmitting the entire set of feed segments through the network 126 and allows the operator 134 to monitor the environment 132 of the machine 102 at the worksite 100 without difficulty.

Referring to FIG. 9, an exemplary method for visually monitoring the environment 132 surrounding the machine 102 for facilitating control of the machine 102 from the ROS 130 is discussed. The method is discussed by way of a flowchart 900 that illustrates exemplary steps associated with the method.

The method begins with the at least one image capturing device 160 capturing the at least one video feed to indicate the environment 132 surrounding the machine 102 at the ROS 130, at 902. At 904, the control system 202 determines the gear position of the transmission 150 of the machine 102 during the machine movement. At 906, the control system 202 determines the steering angle associated with the steering system 144 of the machine 102 during the machine movement.

Subsequent to determining the gear position and the steering angle, the control system 202 may select the one or more feed segments from the entire set of feed segments based on the gear position and the steering angle, at 908. At 910, the control system 202 transmits the one or more feed segments to the ROS 130 through the network 126 at the bitrate higher than the first bitrate and the remaining feed segments of the entire set of feed segments to the ROS 130 at the bitrate lesser than the second bitrate. The second bitrate is less than or equal to the first bitrate facilitated by a current network bandwidth associated with transmitting the entire set of feed segments through the network 126.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the present disclosure (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the system, method, and/or the work machine of the present disclosure without departing from the scope of the disclosure. Other embodiments will be apparent to those skilled in the art from consideration of the specification and practice of the system, method, and/or the work machine disclosed herein. It is intended that the specification and examples be considered as exemplary only, with a true scope of the disclosure being indicated by the following claims and their equivalent.

What is claimed is:

1. A method for visually monitoring an environment surrounding a mobile machine for facilitating control of the mobile machine from a remote operator station by an operator, the method comprising:

capturing, by at least one image capturing device, at least one video feed visually representative of the environment surrounding the mobile machine at the remote operator station, the at least one video feed split into multiple feed segments;

determining, by a control system coupled to the at least one image capturing device, a gear position of a transmission of the mobile machine during machine movement;

determining, by the control system, a steering angle associated with a steering system of the mobile machine during the machine movement;

selecting, by the control system, one or more feed segments from an entire set of feed segments based on the gear position and the steering angle; and transmitting, by the control system, the selected one or more feed segments to the remote operator station through a network at a bitrate higher than a first bitrate and a remaining feed segments of the entire set of feed segments to the remote operator station at a bitrate lesser than a second bitrate, wherein the second bitrate is less than or equal to the first bitrate facilitated by a current network bandwidth associated with transmitting the entire set of feed segments through the network.

2. The method of claim 1 further including:

allocating, by the control system, a minimum threshold of network bandwidth for dedicated transmission of the selected one or more feed segments at at least the first bitrate, and allocating, by the control system, a remaining percentage of network bandwidth for transmitting the remaining feed segments at at least the second bitrate.

3. The method of claim 1, wherein the at least one image capturing device includes a plurality of image capturing devices capturing two or more video feeds at least partially distinct from one another and visually representative of the environment surrounding the mobile machine at the remote operator station, and wherein each video feed of the one or more video feeds is split into multiple feed segments, and further wherein the entire set of feed segments includes the multiple feed segments from each of the two or more video feeds.

4. The method of claim 1 further including dynamically throttling, by the control system, the bitrate of the transmission of one or more adjacently located feed segments of the entire set of feed segments based on the steering angle and the gear position.

5. The method of claim 1, wherein the selected one or more feed segments transmitted with the bitrate higher than the first bitrate correspond to portions in a field of view displayed on at least one display at the remote operator station that enable a visualization of a region in a direction towards which the machine movement is executed.

6. The method of claim 1, wherein the selected one or more feed segments and the remaining feed segments of the entire set of feed segments are consecutively arranged one after the other in a series in a field of view displayed on at least one display at the remote operator station.

7. The method of claim 1, wherein selecting the one or more feed segments based on the gear position and the steering angle includes detecting, by the control system, a current bandwidth value associated with the network to recede below a threshold bandwidth value.

8. The method of claim 1, wherein the gear position is one of forward and reverse in which the mobile machine executes movement in a forward direction and a reverse direction opposite the forward direction, respectively.

9. The method of claim 1, wherein a number of the selected one or more feed segments transmitted with the bitrate higher than the first bitrate is determined based on a request generated at the remote operator station.

10. The method of claim 1, further including transmitting, by the control system, the entire set of feed segments to the remote operator station with same bitrate or with a bitrate defined within a bitrate range when the gear position is either of a neutral position or a parking position.

11. A system for visually monitoring an environment surrounding a mobile machine for facilitating control of the mobile machine from a remote operator station by an operator, the system comprising:

at least one image capturing device to capture at least one video feed visually representative of the environment surrounding the mobile machine at the remote operator station, the at least one video feed split into multiple feed segments; and a control system coupled to the at least one image capturing device, the control system configured to:

determine a gear position of a transmission of the mobile machine during machine movement;

determine a steering angle associated with a steering system of the mobile machine during the machine movement;

select one or more feed segments from an entire set of feed segments based on the gear position and the steering angle; and transmit the selected one or more feed segments to the remote operator station through a network at a bitrate higher than a first bitrate and a remaining feed segments of the entire set of feed segments to the remote operator station at a bitrate lesser than a second bitrate, wherein the second bitrate is less than or equal to the first bitrate facilitated by a current network bandwidth associated with transmitting the entire set of feed segments through the network.

12. The system of claim 11, wherein the control system is configured to:

allocate a minimum threshold of network bandwidth for dedicated transmission of the selected one or more feed segments at at least the first bitrate, and allocate a remaining percentage of network bandwidth for transmitting the remaining feed segments at at least the second bitrate.

13. The system of claim 11, wherein the at least one image capturing device includes a plurality of image capturing devices capturing two or more video feeds at least partially distinct from one another and visually representative of the environment surrounding the mobile machine at the remote operator station, and wherein each video feed of the one or more video feeds is split into multiple feed segments, and further wherein the entire set of feed segments includes the multiple feed segments from each of the two or more video feeds.

14. The system of claim 11, wherein the control system is configured to:

dynamically throttling the bitrate of the transmission of one or more adjacently located feed segments of the entire set of feed segments based on the steering angle and the gear position.

15. The system of claim 11, wherein the selected one or more feed segments transmitted with the bitrate higher than the first bitrate correspond to portions in a field of view displayed on at least one display at the remote operator station that enable a visualization of a region in a direction towards which the machine movement is executed.

16. The system of claim 11, wherein the selected one or more feed segments and the remaining feed segments of the entire set of feed segments are consecutively arranged one after the other in a field of view displayed on at least one display at the remote operator station.

17. The system of claim 11, wherein to select the one or more feed segments based on the gear position and the steering angle, the control system is configured to detect a current bandwidth value associated with the network to recede below a threshold bandwidth value.

18. The system of claim 11, wherein the gear position is one of forward and reverse in which the mobile machine executes movement in a forward direction and a reverse direction opposite the forward direction, respectively.

19. The system of claim 11, wherein a number of the selected one or more feed segments transmitted with the bitrate higher than the first bitrate is determined based on a request generated at the remote operator station.

20. The system of claim 11, wherein the control system is configured to:

transmit the entire set of feed segments to the remote operator station with same bitrate or with a bitrate defined within a bitrate range when the gear position is either of a neutral position or a parking position.

* * * * *